United States Patent [19]

Braukmann

[11] 4,122,863
[45] Oct. 31, 1978

[54] DIFFERENTIAL PRESSURE OVERFLOW VALVE

[75] Inventor: Bernard W. Braukmann, Mosbach, Fed. Rep. of Germany

[73] Assignee: Braukmann Armaturen AG, Rothrist, Switzerland

[21] Appl. No.: 693,344

[22] Filed: Jun. 7, 1976

[51] Int. Cl.² .................................... F16K 37/00
[52] U.S. Cl. .......................... 137/557; 73/205 R; 210/87;94;95
[58] Field of Search .............. 137/551, 557; 73/205 R

[56] References Cited

U.S. PATENT DOCUMENTS

| | | | |
|---|---|---|---|
| 1,215,129 | 2/1917 | Edlich | 137/557 X |
| 1,649,602 | 11/1927 | Ledoux et al. | 73/205 R |
| 2,661,847 | 12/1953 | Buettner | 210/95 X |
| 3,472,275 | 10/1969 | Castro et al. | 73/205 R |
| 3,474,906 | 10/1969 | Tennis | 137/557 X |
| 3,575,197 | 4/1971 | Ray | 137/557 X |
| 3,603,148 | 9/1971 | Rikuta | 73/205 R X |
| 3,768,510 | 10/1973 | Reves | 137/557 |
| 3,785,333 | 1/1974 | Warncke et al. | 137/557 X |

Primary Examiner—William R. Cline
Attorney, Agent, or Firm—William T. Howell

[57] ABSTRACT

A differential pressure overflow valve has a housing with a differential pressure indicator therein consisting of a cylinder containing a piston moving against the force of a spring; the piston is spaced from said cylinder to provide an annular gap. The housing also has an inlet and an outlet pressure chamber; the inlet pressure chamber is connected by a passage to one end of the cylinder and the outlet chamber by another passage to the other end of the cylinder. To provide a choke effect the cross sectional area of the annular gap is substantially smaller than the cross sectional area of the connecting passages.

2 Claims, 4 Drawing Figures

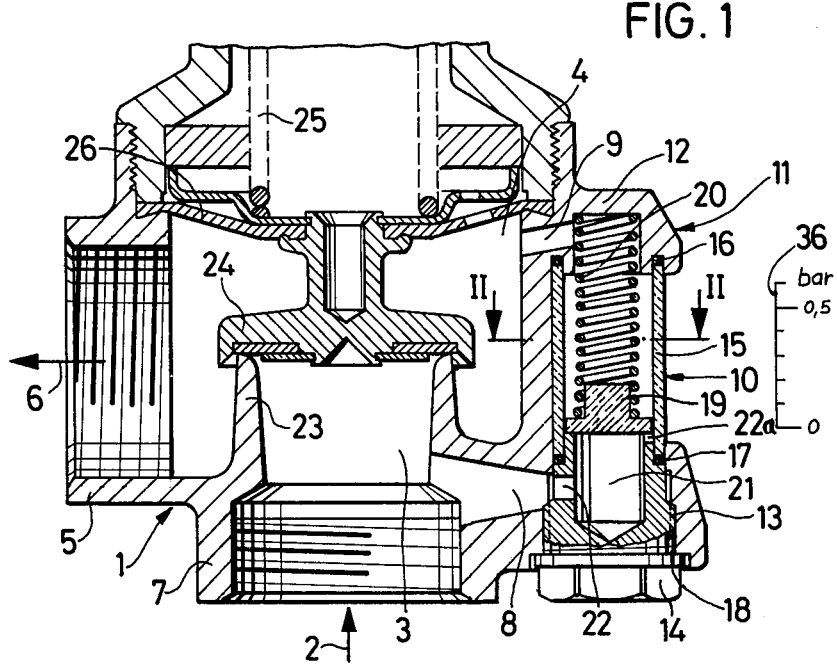
FIG. 1
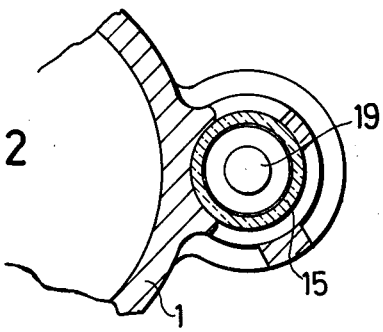
FIG. 2
FIG. 3
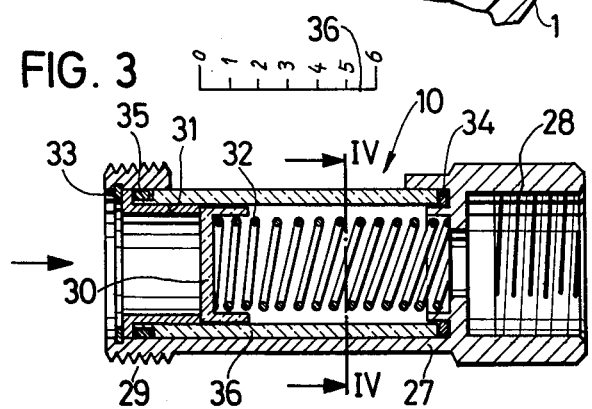
FIG. 4

DIFFERENTIAL PRESSURE OVERFLOW VALVE

FIELD OF INVENTION

The invention relates to a differential-pressure overflow valve, more particularly for a domestic heating installation.

PRIOR ART

Overflow valves of this kind are already known per se and they are fitted between the inlet and return lines of a domestic heating installation, for example. They keep the pump pressure in one or two pipe heating installations constant and avoid noises. In the case of circulating gas water heaters, a minimal volume of circulating water is ensured, even if the radiator valves are thermostatically closed. Such valves are of simple design and require no control lines or the like. When installed, they are set up to a predetermined differential pressure, after which they operate automatically.

It is a disadvantage though that it is no longer possible to check whether the differential pressure is in fact being maintained during continuous operation. It is, therefore, impossible to determine whether changes in the predetermined differential pressure have been brought about by the pump or in the pipelines. Moreover, in the event of trouble, or after repairs have been made, a check of the differential pressure requires the taking of new measurements, involving the making of special connections, the use of instruments and a considerable expenditure of time and money.

SUMMARY OF THE INVENTION

It is, therefore, the purpose of this present invention to provide a differential pressure overflow valve, more particularly for a domestic heating installation by means of which the differential pressure may easily be checked at any time while the installation is in operation, thus making it possible to alter the said pressure if the check shows that this is required, the actual value being converted to the rated value of the said differential pressure.

To this end, the invention proposes a differential pressure overflow valve more particularly for a domestic heating installation with connecting passages, which pass through the wall of the valve housing in the region of the outlet and inlet pressure chambers which make it possible to connect a differential pressure indicator by means of which the differential pressure may be checked at any time. The differential pressure indicator is, of course, connected to a differential pressure measuring device, or is combined therewith the said device determining the pressure differential between the inlet pressure and the outlet pressure and converting this into an appropriate indication. For the sake of simplicity, reference will be made hereinafter to a pressure differential indicator only, even when a combined differential pressure measuring and indicating device is meant. The said indicator may be connected by means of two pipelines to the two passages in the differential pressure overflow valve. However, it is substantially simpler, and takes up less room, if, according to a specially preferred example of embodiment of the invention, the differential pressure indicator is secured to the housing of the overflow valve. The two thus constitute a single unit, thus eliminating the assembly costs of a conventional differential pressure overflow valve. According to one advantageous development of the invention, a holder or the housing of the differential pressure indicator is produced, preferably cast, integrally with the housing of the differential pressure overflow valve. In this case, the savings in material and assembly time, especially in view of the hydraulic connection between the inlet and outlet pressure chambers through the differential pressure indicator are particularly great.

According to another characteristic of the invention, the differential pressure indicator consists essentially of a cylinder containing a piston moving therein against the force of a spring, one end of the said cylinder being connected to the connecting passage from the inlet pressure chamber, while the other end is connected to the connecting passage from the outlet pressure chamber. In addition to this, the forces applied by the said spring and the outlet pressure act in the same direction, and the piston co-operates with an indicator scale or the like. The piston is easily displaced in the cylinder and is not sealed therein and an overflow along the walls of the piston is thus possible. The position of the piston in the cylinder is determined by the excess pressure present, and is therefore an indication thereof. The position of the piston at any given moment must be visible from the outside, so that it can be read off the scale. Magnetic or electromagnetic converting methods are conceivable for this purpose. It is substantially simpler, however, if, according to another configuration of the invention, the cylinder is in the form of a transparent tube carrying a scale, the ends of the said cylinder being sealed off at least from the holder or housing containing the hydraulic connections. The said tube may be made of glass, for instance, the scale being cut or etched thereinto or applied thereto. It is, of course, also possible to fit the scale to the holder, the housing, or to a separate element fitted outside the said tube.

According to still another characteristic of the invention, one end of the cylinder may rest upon a threaded member screwed into, or a supporting member inserted into, the holder of housing of the differential pressure measuring device. In this case, the other end of the cylinder preferably bears against a stationary part of the holder or housing, a seal being provided in each case. This makes it easy to insert the differential pressure indicator into, or to remove it from, the bore accommodating the threaded or inserted member, or to replace it. The threaded member must, of course, be designed in a manner such that it neither blocks nor impedes the hydraulic connection within the differential pressure indicator or between the two passages in the differential overflow valve. Furthermore, care must be taken to ensure that the threaded member is properly sealed off from the outside.

According to a further development of the invention, the cross-sectional area of the annular gap between the piston and the wall of the cylinder is substantially less than the cross-sectional are of the connecting passages for the differential pressure indicator. This makes it possible for the medium to flow externally of the piston towards the drop in pressure. The annular gap thus acts as a choke controlling the flow.

BRIEF DESCRIPTION OF THE DRAWINGS

The invention will now be described in relation to the accompanying drawings, in which:

FIG. 1 is a broken away vertical section through the differential pressure overflow valve according to the invention;

FIG. 2 is also a broken away section along the lines II-II in FIG. 1;

FIG. 3 is a central longitudinal section through a differential pressure indicator to be connected to the differential pressure overflow valve;

FIG. 4 is a section along the line IV-IV in FIG. 3.

DESCRIPTION OF A PREFERRED EMBODIMENT

The differential pressure overflow valve, shown merely in part, is of conventional design and has a housing 1. The medium flows, in the direction of arrow 2, into inlet pressure chamber 3 and leaves outlet pressure chamber 4, through connection 5, in the direction of arrow 6. The other connection on housing 1 is marked 7.

According to the inventon, inlet pressure chamber 3 is in hydraulic communication with differential pressure indicator 10 through a connecting passage 8, while outlet pressure chamber 4 is in hydraulic communication therewith through a connecting passage 9. The difference between the pressures obtaining in inlet pressure chamber 3 and outlet pressure chamber 4 is determined by differential pressure indicator 10 and is indicated accordingly. The said indicator is therefore also a differential pressure measuring device.

Housing 11 of the differential pressure indicator is in the form of a sleeve and is made or cast integrally with the housing of the differential pressure overflow valve. Upper end 12 of housing 11 is in the form of a cap, whereas the lower end has a thread 13 for the accommodation of a cap-like threaded element 14. Clamped between the latter and upper end 12 is a cylinder 15 made of glass or a transparent plastic, the ends thereof being seated upon sealing rings 16, 17. Upper sealing ring 16 rests in a groove in upper end 12 of the housing while sealing ring 17 is accommodated in a groove formed by housing 11 of differential pressure indicator 10 and threaded element 14, the latter being sealed in relation to the housing by means of an additional sealing ring 18.

A free piston 19 moves up and down inside glass cylinder 15 and is pressed against the inner end of threaded element 14 by means of a helical compression spring 20. The play between piston 19 and cylinder 15 is such that a medium or water may flow past the outside of the said piston, whereas, on the other hand, this annular gap between the said cylinder and piston is substantially smaller than the cross-sectional area of connecting passages 8 and 9. This annular gap therefore acts as a choke.

It will be seen from the drawing that connecting passage 9 opens into the cavity in the upper end 12 of the housing, whereas connecting passage 8 communicates with the interior 21 of threaded element 14. To this end, the latter is provided with a transverse passage 22 or with a corresponding slot, which, when threaded element 14 is screwed home, comes to rest against the outer end of connecting passage 8. In order to improve the hydraulic connection between the inlet and outlet pressure chambers, a notch 22a may be provided in the inner end of threaded element 14.

The spring for piston 19, which is in the form of a compression spring, is located in the part of cylinder 15 exposed to the outlet pressure. The differential pressure acting upon piston 19 causes it to lift away from threaded element 14 by a certain amount, the amount of this lift being an indication of the differential pressure and being read off on a scale on the glass cylinder, or housing 11, of the differential pressure indicator. FIG. 1 also shows quite clearly that all parts of the differential pressure indicator may easily be installed or removed from below through thread 13.

The differential pressure overflow valve, the pressure ratios of which are to be indicated by means of a built-in differential pressure indicator, comprises in known fashion a tubular valve seat 23 and a plate valve 24 co-operating therewith and loaded by means of a compression spring 25. A diaphragm 26 is fitted between the lower and upper parts of the housing of one of the differential pressure overflow valves.

FIGS. 3 and 4 show a differential pressure indicator which is practically the same as that shown in FIGS. 1 and 2. Housing 27 thereof is again in the form of a sleeve and has an upper internally threaded connection 28 and a lower threaded connection 29 in the form of a screw thread. Piston 30, the cross section of which is in the form of a pot, is pressed by compression spring 32, against the inner end of shouldered sleeve 31. The shoulder of this sleeve bears against a circlip 33 snapped into housing 27 of the indicator which, of course, also measures the differential pressure. The necessary sealing is provided by seals 34, 35. Scale 36, shown separately, may again be located on the glass cylinder, or on a web 37 of housing 27.

Checking the differential pressure serves to set it to its predetermined value, i.e., this invention may be used both to check and maintain the predetermined pressure differential.

I claim:

1. A differential pressure overflow valve having a housing, an inlet and an outlet to said housing, an inlet and outlet pressure chamber in said housing connected respectively to said inlet and outlet, a valve seat in said housing between said inlet and outlet chambers, a flexible diaphragm in said outlet pressure chamber attached to said housing, a valve plate supported by said diaphragm, a first spring bearing on said diaphragm and biasing said valve plate against said valve seat to effect closure of the latter, a differential pressure indicator in said housing, said indicator having a cylinder, a first passage connecting said inlet pressure chamber to said cylinder, a second passage connecting said outlet chamber to said cylinder, a piston in said cylinder and spaced therefrom to provide an annular gap, stop means in said cylinder for said piston located between said first passage and said piston, a second spring acting on said piston to bias the latter against said stop means, said cylinder being in the form of a transparent tube carrying a scale, a lift on said piston due to pressure exerted thereon through the first passage indicating the differential pressure between said inlet and outlet, the cross sectional area of said annular gap being substantially smaller than the total cross sectional area of said first and second passages to provide a choke effect.

2. A differential pressure overflow valve according to claim 1 wherein the ends of said cylinder are sealed off from said housing and a tubular threaded member is screwed into said housing with an end of said cylinder resting on said threaded member, said first passage connecting to said cylinder through said tubular member.

* * * * *